(12) United States Patent
Shin et al.

(10) Patent No.: US 9,825,302 B1
(45) Date of Patent: Nov. 21, 2017

(54) METAL FOIL, METAL FOIL MANUFACTURING METHOD AND METHOD FOR MANUFACTURING ELECTRODE USING THE SAME

(71) Applicant: KOREA JCC CO., LTD., Cheongwon-gun (KR)

(72) Inventors: Dal Woo Shin, Cheongju-si (KR); Mun Soo Lee, Cheongju-si (KR); Jin Sik Shin, Cheongju-si (KR); So Yeon Han, Cheongju-si (KR); Rae Cheol Kang, Cheongju-si (KR); Ji Yoon Park, Cheongju-si (KR)

(73) Assignee: KOREA JCC CO., LTD., Cheongwon-Gun (KR)

( * ) Notice: Subject to any disclaimer, the term of this patent is extended or adjusted under 35 U.S.C. 154(b) by 0 days.

(21) Appl. No.: 15/196,548

(22) Filed: Jun. 29, 2016

(30) Foreign Application Priority Data

May 23, 2016 (KR) .................. 10-2016-0062864

(51) Int. Cl.
| | | |
|---|---|---|
| *B05D 5/12* | (2006.01) | |
| *H01M 4/66* | (2006.01) | |
| *H01M 10/0525* | (2010.01) | |
| *H01M 4/525* | (2010.01) | |
| *H01M 4/62* | (2006.01) | |
| *H01M 4/583* | (2010.01) | |
| *H01M 4/04* | (2006.01) | |

(52) U.S. Cl.
CPC ......... *H01M 4/668* (2013.01); *H01M 4/0404* (2013.01); *H01M 4/525* (2013.01); *H01M 4/583* (2013.01); *H01M 4/623* (2013.01); *H01M 4/667* (2013.01); *H01M 10/0525* (2013.01)

(58) Field of Classification Search
CPC combination set(s) only.
See application file for complete search history.

(56) References Cited

U.S. PATENT DOCUMENTS

2009/0029255 A1    1/2009  Ohmori

FOREIGN PATENT DOCUMENTS

KR         101357464         2/2014

*Primary Examiner* — Austin Murata
(74) *Attorney, Agent, or Firm* — Cantor Colburn LLP

(57) ABSTRACT

Provided are a metal foil, a metal foil manufacturing method and a method for manufacturing an electrode using the same, in which the adhesion between the metal foil and a conductive resin layer and the coating performance of the conductive resin layer can be improved by treating the surface of the metal foil. The metal foil comprises: a metal base substrate; a surface treatment layer formed on at least one surface of the metal base substrate by treating the surface of the metal base substrate; and a conductive resin layer applied to the surface of the surface treatment layer, wherein the surface treatment layer has a surface energy of 34-46 dyne/cm.

9 Claims, 6 Drawing Sheets

|  | Capacity retention rate (%) | | | | Impedance (Ω) |
|---|---|---|---|---|---|
|  | 1C | 5C | 10C | 20C |  |
| Battery 1 | 98 | 83 | 71 | 62 | 6.13 |
| Battery 2 | 99 | 98 | 88 | 84 | 1.30 |

METAL FOIL, METAL FOIL MANUFACTURING METHOD AND METHOD FOR MANUFACTURING ELECTRODE USING THE SAME

CROSS-REFERENCE TO RELATED APPLICATION

This application claims the benefit of Korean Patent Application No. 10-2016-0062864, filed on May 23, 2016 in the Korean Intellectual Property Office, the disclosure of which is incorporated herein by reference.

BACKGROUND OF THE INVENTION

1. Field of the Invention

The present invention relates to a metal foil, a metal foil manufacturing method and a method for manufacturing an electrode using the same, and more particularly, to metal foil, a metal foil manufacturing method and a method for manufacturing an electrode using the same, in which the adhesion between the metal foil and a conductive resin layer and the coating performance of the conductive resin layer can be improved by treating the surface of the metal foil.

2. Description of the Related Art

Conventional lithium ion secondary batteries or electric double layer capacitors have electrodes, and each of the electrodes comprises an electrode material and a current collector to which the electrode material is applied. The electrodes are required to have high capacity per unit volume and low internal resistance so that they can satisfy properties, including large current charging/discharging capabilities, high energy density and high output density. To satisfy such properties of the electrodes, technology of reducing the interfacial resistance between the electrode material and the current collector is required. A current collector that is used in the cathode of a lithium ion secondary battery or the electrode of an electrical double-layer capacitor is formed of a metal foil such as an aluminum foil. The aluminum foil is manufactured through a rolling process at high temperature and high pressure, and rolling oil is used for cooling in this rolling process. For these reasons, an aluminum oxide layer or an oil layer, which is non-conductive, remains on the surface of the final aluminum foil. The oxide layer or the oil layer has the problem of increasing the interfacial resistance between the aluminum foil and the electrode material. Particularly, the oil layer has the problem of reducing the adhesion of the electrode material to cause the peeling of the electrode material as charge/discharge cycles are repeated, thereby reducing the output properties of the electrode in charge/discharge cycles and reducing the calendar life of the electrode.

Korean Patent No. 1357464 (Patent Document 1) and U.S. Pat. No. 8,663,845 (Patent Document 2) disclose technologies in which an conductive resin layer is formed between an aluminum foil and an electrode material to reduce the interfacial resistance between the aluminum foil and the electrode material and increase the adhesion therebetween, thereby solving the above-described problem.

Korean Patent No. 1357464 (Patent Document 1) will now be briefly described.

Korean Patent No. 1357464 relates to a secondary-battery current collector, a secondary battery cathode, a secondary battery anode, a secondary battery, and a manufacturing method thereof, in which the secondary-battery current collector comprises an aluminum or copper foil having a coating layer containing a compound obtained by crosslinking at least one polysaccharide polymer, selected from the group consisting of chitin and chitosan, with an acid anhydride, and fine carbon particles. Herein, the coating layer has a thickness of 0.1-10 μm, and the fine carbon particles have a particle size of 10-100 nm.

In the case of the current collector disclosed in Korean Patent No. 1357464, an conductive resin layer is applied to the surface of the metal foil in order to improve the adhesion of the electrode material to the surface. This metal foil has problems in that, because an oxide layer or an oil layer remain on the metal foil during the manufacturing process, the conductive resin layer is not easily applied to the metal foil, and the applied conductive resin layer is easily peeled, resulting in an increase in the interfacial resistance between the metal foil and the electrode material. In addition, it has a problem in that the electrode material applied to the conductive resin layer is also peeled, resulting in a decrease in the output and calendar life characteristics of the lithium ion secondary battery or the electrical double-layer capacitor.

PATENT DOCUMENTS

Patent Document 1: Korean Patent No. 1357464 (registered on Jan. 23, 2014);
Patent Document 2: U.S. Pat. No. 8,663,845 (registered on Mar. 3, 2014);

SUMMARY OF THE INVENTION

Accordingly, the present invention has been made in order to solve the above-described problems, and it is an object of the present invention to provide a metal foil, a metal foil manufacturing method and a method for manufacturing an electrode using the same, in which the adhesion between the metal foil and a conductive resin layer and the coating performance of the conductive resin layer can be improved by treating the surface of the metal foil.

Another object of the present invention is to provide a metal foil, a metal foil manufacturing method and a method for manufacturing an electrode using the same, in which the adhesion between the metal foil and a conductive resin layer and the coating performance of the conductive resin layer can be improved by treating the surface of the metal foil, thereby alleviating the peeling of an electrode material from the metal foil to thereby reduce the interfacial resistance of the metal foil.

Still another object of the present invention is to provide a metal foil, a metal foil manufacturing method and a method for manufacturing an electrode using the same, in which the adhesion between the metal foil and a conductive resin layer and the coating performance of the conductive resin layer can be improved by treating the surface of the metal foil, thereby alleviating the peeling of an electrode material from the metal foil to thereby reduce the interfacial resistance of the metal foil, thereby improving the output and calendar life characteristics of a lithium ion secondary battery or an electrical double-layer capacitor when the electrode of the present invention is applied to the lithium ion secondary battery or the electrical double-layer capacitor.

To achieve the above objects, the present invention provides a metal foil comprising: a metal base substrate; a surface treatment layer formed on at least one surface of the metal base substrate by treating the surface of the metal base substrate; and a conductive resin layer applied to the surface of the surface treatment layer, wherein the surface treatment layer has a surface energy of 34-46 dyne/cm.

The present invention also provides a method for manufacturing a metal foil, comprising the steps of: preparing a surface treatment solution; treating the surface of a metal base substrate by dipping the metal base substrate in the surface treatment solution while spraying the surface treatment solution onto the surface of the metal base substrate, thereby forming a surface treatment layer on the metal base substrate; and applying a conductive resin to the surface of the surface treatment layer to form a conductive resin layer, wherein the surface treatment solution is prepared by mixing 3-10 wt % of an alkaline metal oxide, 0.1-10 wt % of a surfactant, 0.5-10 wt % of a reducing agent and 70-96.4 wt % of deionized water to prepare an undiluted surface treatment solution, and diluting 3-10 wt % of the undiluted surface treatment solution with 90-97 wt % of deionized water.

The present invention also provides a method for manufacturing an electrode, comprising the steps of: preparing a surface treatment solution; treating the surface of a metal base substrate by dipping the metal base substrate in the surface treatment solution while spraying the surface treatment solution onto the surface of the metal base substrate, thereby forming a surface treatment layer on the metal base substrate; applying a conductive resin to the surface of the surface treatment layer to form a conductive resin layer; and applying an electrode material to the surface of the conductive resin layer to form an electrode material layer, wherein the surface treatment solution is prepared by mixing 3-10 wt % of an alkaline metal oxide, 0.1-10 wt % of a surfactant, 0.5-10 wt % of a reducing agent and 70-96.4 wt % of deionized water to prepare an undiluted surface treatment solution, and diluting 3-10 wt % of the undiluted surface treatment solution with 90-97 wt % of deionized water.

BRIEF DESCRIPTION OF THE DRAWINGS

The above and/or other aspects of the present invention will become apparent and more readily appreciated from the following description of the exemplary embodiments, taken in conjunction with the accompanying drawings in which.

DETAILED DESCRIPTION OF THE INVENTION

Figure 1:
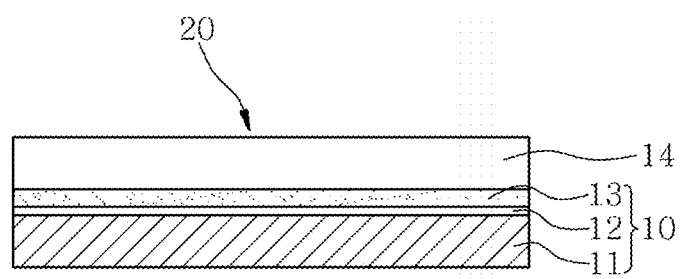
FIG. 1 is a cross-sectional view of an electrode having a metal foil applied thereto according to the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, examples of a metal foil according to the present invention, a method for manufacturing the metal foil, and a method for manufacturing an electrode using the same, will be described with reference to the accompanying drawings.

Figure 2:
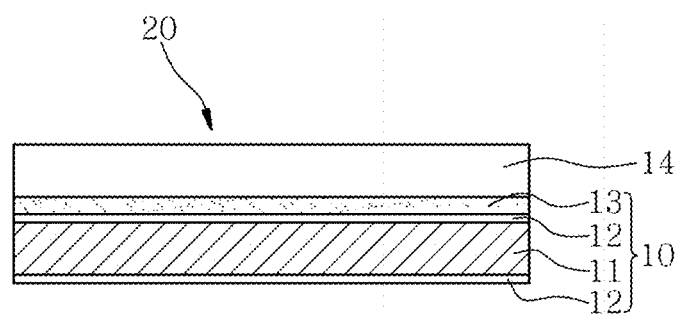
FIG. 2 is a cross-sectional view showing another example of the metal foil shown in FIG. 1.
Figure 3:
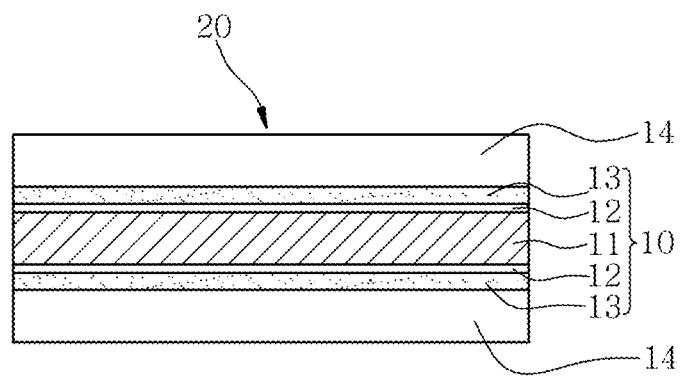
FIG. 3 is a cross-sectional view showing still another example of the metal foil shown in FIG. 1.

As shown in FIGS. 1 to 3, a metal foil 10 according to the present invention comprises a metal base substrate 11, a surface treatment layer 12 and a conductive resin layer 13.

The metal base substrate 11 corresponds to the base portion of the metal foil 10, and the surface treatment layer 12 is formed on at least one surface of the metal base substrate 11 by treating the surface of the metal base substrate 11. Namely, as shown in FIG. 1, the surface treatment layer 12 is formed on the upper surface of the metal base substrate 11, or as shown in FIGS. 2 and 3, the surface treatment layer 12 is formed on both the upper and lower surfaces of the metal base substrate 11.

The surface treatment layer 12 is formed to have a surface energy of 34-46 dyne/cm, and the conductive resin layer 13 is formed on the surface of the surface treatment layer 12.

The configuration of the metal foil 10 according to the present invention will now be described in detail.

As shown in FIGS. 1 to 5, the metal base substrate 11 is formed in a foil shape and made of aluminum or copper.

As shown in FIGS. 1 to 3, the surface treatment layer 12 is formed by treating the surface of the metal base substrate 11 with a surface treatment solution so as to have a surface energy of 34-46 dyne/cm. Namely, the surface treatment layer 12 is formed between the metal base substrate 11 and the conductive resin layer 13 so as to have a surface energy of 34-46 dyne/cm, thereby increasing the adhesion of the conductive resin layer 13 to the surface of the metal base substrate 11 and improving the coating performance of the conductive resin layer 13 to exhibit the reliability of coating work. As used herein, the term "coating performance" refers to an extent to which the conductive resin layer 13 is adhered uniformly and closely to the surface of the metal base substrate 11 by the surface treatment layer 12 so as to have a uniform thickness. The surface treatment solution is prepared by mixing 3-10 wt % of an alkaline metal oxide, 0.1-10 wt % of a surfactant, 0.5-10 wt % of a reducing agent and 70-96.4 wt % of deionized water to prepare an undiluted surface treatment solution, and diluting 3-10 wt % of the undiluted surface treatment solution with 90-97 wt % of deionized water.

As shown in FIGS. 1 to 3, the conductive resin layer 13 is formed by applying a conductive resin material to the surface of the surface treatment layer 12 so as to be adhered closely to the surface of the metal base substrate 11 by the surface energy of the surface treatment layer 12.

As shown in FIG. 1, the conductive resin layer 13 is disposed on the upper surface of the surface treatment layer 12, or as shown in FIG. 2, the conductive resin layer 13 is disposed on the upper surface of the surface treatment layer 12, on which the electrode material layer 14 is to be formed, among the two surface treatment layers 12. Alternatively, as shown in FIG. 3, the conductive resin layer 13 is disposed on both the upper and lower surfaces of the surface treatment layer 12.

This conductive resin layer 13 is formed of a conductive resin material selected from among acrylic resin, nitrocellulose and chitosan.

A method for manufacturing the above-described metal foil 10 of the present invention will now be described.

Figure 4:
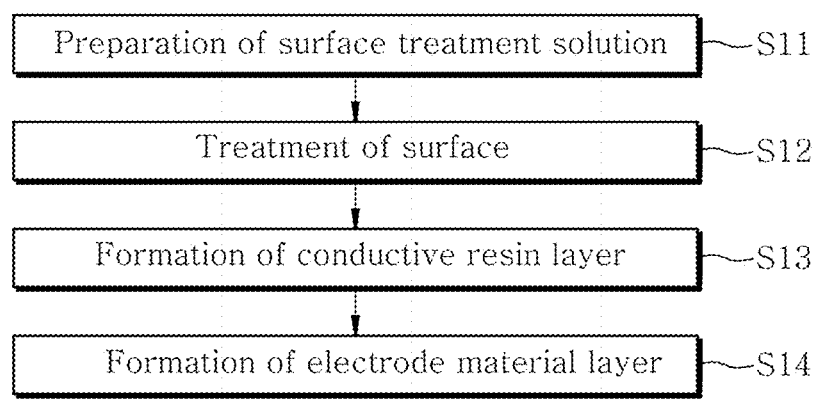
FIG. 4 is a process flow chart showing a method for manufacturing an electrode using a metal foil manufacturing method of the present invention.

In the method for manufacturing the metal foil 10 of the present invention, as shown in FIG. 4, a surface treatment solution is first prepared (S11). In addition, the metal base substrate 11 is formed in a foil shape and is made of aluminum or copper. The surface treatment solution for treating the surface of the metal base substrate 11 is prepared by mixing 3-10 wt % of an alkaline metal oxide, 0.1-10 wt % of a surfactant, 0.5-10 wt % of a reducing agent and 70-96.4 wt % of deionized water to prepare an undiluted surface treatment solution, and diluting 3-10 wt % of the undiluted surface treatment solution with 90-97 wt % of deionized water.

The alkaline metal oxide that is used to prepare the surface treatment solution is one selected from among sodium hydroxide, sodium carbonate, and sodium metasilicate, and the surfactant that is used to prepare the surface treatment solution is one selected from among sodium oleate, polyoxyethylene alkylphenyl ether, and sodium myristate. In addition, the reducing agent that is used to prepare the surface treatment solution is one selected from among sodium metasilicate, sodium silicate, benzthiazol, and benzimidazole.

For preparation of the surface treatment solution, the surfactant and the reducing agent are suitably selected depending on the kind of alkaline metal oxide. For example, when sodium hydroxide is used as the alkaline metal oxide, sodium oleate is used as the surfactant, and sodium metasilicate is used as the reducing agent. When sodium carbonate is used as the alkaline metal oxide, polyoxyethylene alkylphenyl ether is used as the surfactant, and sodium silicate is used as the reducing agent. When sodium metasilicate is used as the alkaline metal oxide, sodium myristate is used as the surfactant, and benzthiazol or benzimidazole is used as the reducing agent.

Figure 5:
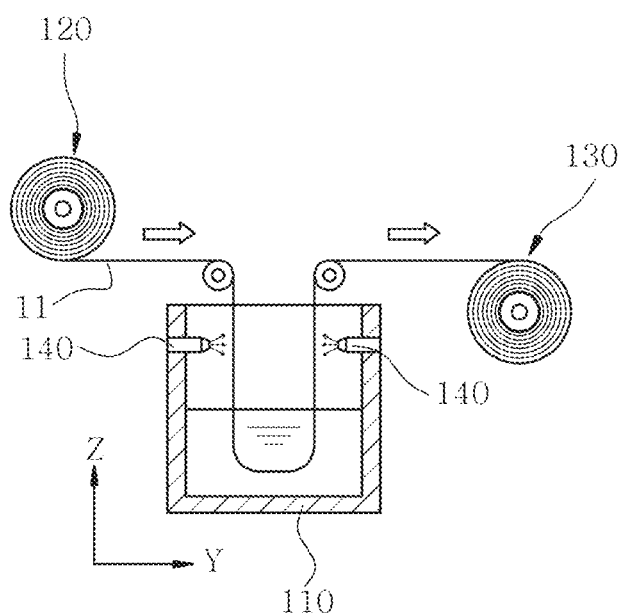
FIG. 5 is a side view of an apparatus for forming the surface treatment layer shown in FIG. 1.

After preparation of the surface treatment solution, as shown in FIGS. 4 and 5, the metal base substrate 11 is dipped in the surface treatment solution to treat the surface of the metal base substrate 11 (S12).

Treatment of the surface of the metal base substrate 11 is performed by storing the surface treatment solution in a surface processing bath 110 in an apparatus for manufacturing the surface treatment layer 12, that is, a roll-to-roll apparatus shown in FIG. 5, and then dipping the metal base substrate 11 in the surface treatment solution for 3-20 seconds in a state in which the surface treatment solution is maintained at a temperature of 60 to 85° C. For example, treatment of the surface is performed by disposing the surface treatment solution-containing surface processing bath 110 between a winding roller 120 and a withdrawal roller 130, and then moving the metal base substrate 11 wound around the winding roller 120 in the arrow direction in such a manner as to be dipped in the surface processing bath 110 for 3-20 seconds.

An example of the surface treatment solution stored in the surface processing bath 110 contains sodium hydroxide as the alkaline metal oxide, sodium oleate as the surfactant, and sodium metasilicate as the reducing, in which the alkaline metal oxide, the surfactant and the reducing agent are used in amounts of 3-8 wt %, 0.1-1 wt % and 0.5-3 wt %, respectively. If the sodium hydroxide is used in an amount of more than 8 wt %, it can corrode the metal base substrate 11, and if the sodium metasilicate is used in an amount of more than 3 wt %, it will be excessively reduced to form an oxide layer on the surface of the metal base substrate 11, and thus can cause failure of the metal foil 10. That is, the surface treatment solution is prepared by mixing 3-8 wt % sodium hydroxide as an alkaline metal oxide, 0.1-1 wt % of sodium oleate as a surfactant, 0.5-3 wt % sodium metasilicate of a reducing agent and 88-96.4 wt % of deionized water to prepare an undiluted surface treatment solution, and diluting 3-10 wt % of the undiluted surface treatment solution with 90-97 wt % of deionized water.

Treatment of the surface of the metal base substrate 11 with the surface treatment solution having the above-described composition is performed by dipping the metal base substrate 11 in the surface treatment solution for 3-13 seconds in a state in which the surface treatment solution is maintained at a temperature of 60 to 70° C.

Another example of the surface treatment solution contains sodium carbonate as the alkaline metal oxide, polyoxyethylene alkylphenyl ether as the surfactant, and sodium silicate as the reducing agent, in which the alkaline metal oxide, the surfactant and the reducing agent are used in amounts of 4-10 wt %, 3-10 wt % and 4-6 wt %, respectively. That is, the surface treatment solution is prepared by mixing 4-10 wt % sodium carbonate as as an alkaline metal oxide, 3-10 wt % of polyoxyethylene alkylphenyl ether as the surfactant, 4-6 wt % sodium silicate of a reducing agent and 74-89 wt % of deionized water to prepare an undiluted surface treatment solution, and diluting 3-10 wt % of the undiluted surface treatment solution with 90-97 wt % of deionized water. Treatment of the surface of the metal base substrate 11 with the surface treatment solution having this composition is performed by dipping the metal base substrate 11 in the surface treatment solution for 5-15 seconds in a state in which the surface treatment solution is maintained at a temperature of 70 to 80° C.

Still another example of the surface treatment solution contains sodium metasilicate as the alkaline metal oxide, sodium myristate as the surfactant, and benzthiazol or benzimidazole as the reducing agent, in which the alkaline metal oxide, the surfactant and the reducing agent are used in amounts of 5-10 wt %, 0.1-8 wt % and 0.1-3 wt %, respectively. That is, the surface treatment solution is prepared by mixing 5-10 wt % sodium metasilicate as an alkaline metal oxide, 0.1-8 wt % sodium myristate of as the surfactant, 0.1-3 wt % benzthiazol or benzimidazole of a reducing agent and 79-94.8 wt % of deionized water to prepare an undiluted surface treatment solution, and diluting 3-10 wt % of the undiluted surface treatment solution with 90-97 wt % of deionized water. Treatment of the surface of the metal base substrate 11 with the surface treatment solution having this composition is performed by dipping the metal base substrate 11 in the surface treatment solution for 10-20 seconds in a state in which the surface treatment solution is maintained at a temperature of 75 to 85° C.

The surface treatment step (S12) in the present invention is performed using dipping and nozzle spray methods. In the dipping method in the surface treatment step (S12), the metal base substrate 11 is dipped in the surface treatment solution so that the surface treatment layer 12 is formed throughout at least one surface of the metal base substrate 11. In the nozzle spray method in the surface treatment step (S12), the surface treatment solution is sprayed vertically onto the surface of the metal base substrate 11 so that a smooth surface treatment layer 12 is formed throughout at least one surface of the metal base substrate 11.

As shown in FIG. 5, a nozzle 140 that is used in the nozzle spray method is disposed at both sides of the surface processing bath 110. The surface treatment solution that is sprayed through the nozzle 140 is the same as the surface treatment solution stored in the surface processing bath 110.

The surface treatment step (S12) is performed such that a surface treatment layer 12 having a surface energy of 34-46 dyne/cm is formed on the surface of the metal base substrate 11. The surface energy range was determined by the applicant for the following reasons. When the surface of the metal base substrate 11 was treated to have a surface energy of 34 dyne/cm or higher, the adhesion between the metal base substrate 11 and the conductive resin layer 13 was increased, and the uniform coating properties of the conductive resin layer 13 were ensured. Such results were found in many repeated experiments. In addition, although the surface energy of the metal base substrate 11 is preferably as high as possible, an additional cost is required to increase the surface energy, and for this reason, the surface energy is limited to an upper limit of 46 dyne/cm in the present invention. Thus, the upper limit of the surface energy can further be increased according to the user's needs.

As the surface energy of the surface treatment layer 12 is closer to the surface tension of the conductive resin solution, the wettability of the metal base substrate 11 with the conductive resin solution increases and acts as a driving force for adhesion, and thus the adhesion between the metal base substrate 11 and the conductive resin layer 13 and the coating performance of the conductive resin layer 13 increase.

Generally, the term "surface tension" refers to a tension that acts to reduce the free surface area of liquid. A molecule present near the surface of liquid has a potential energy greater than a molecule present in the liquid, and thus has a surface energy proportional to the surface area of the liquid.

To measure this surface energy, the dyne test is used. The a dyne test is a method in which a solution having an already known dyne value (i.e., characteristic surface tension value) is applied to the surface of a material whose surface energy is to be measured, and then the surface energy of the material is measured based on the aggregation or spreading property of the solution. In other words, the dyne test is a method of measuring surface energy in comparison with a specific surface tension value, and the waiting time for observation is 4 sec for 30-44 dyne/cm and 2 sec for 45-60 dyne/cm. The surface energy is given in units of dyne/cm. As used herein, the term "dyne" refers to the force required to give a mass of 1 g an acceleration of 1 cm/s$^2$.

Examples of the method for forming the surface treatment layer 12 having a surface energy of 34-46 dyne/cm are shown in FIGS. 1 to 3. FIG. 1 shows an example in which the surface treatment layer 12 is formed on the upper surface of the metal base substrate 11 by using the surface treatment solution. In this example, the surface treatment layer 12 is formed using the surface treatment solution in a state in which the lower surface of the metal base substrate is masked. Herein, the masking is performed by bonding a known insulating film to the lower surface of the metal base substrate 11 by an adhesive or applying a known insulating material thereto. For example, when the roll-to-roll apparatus as shown in FIG. 5 is used for formation of the surface treatment layer 12, the masking is performed by bonding a known insulating film to the lower surface of the metal base substrate 11 by an adhesive. FIGS. 2 and 3 show examples in which the surface treatment layer 12 is formed on both the upper and lower surfaces of the metal base substrate 11 by treating the entire surface of the metal base substrate 11 with the surface treatment solution without masking.

The conductive resin layer 13 is formed using a conductive resin solution. A method for preparing the conductive resin solution using a conductive resin material is known, and thus the description thereof is omitted herein. In addition, the surface tension of the conductive resin solution is known, and thus the description thereof is omitted herein. The conductive resin solution is dried at a temperature of 150 to 200° C. for 2-15 minutes to provide the conductive resin layer 13.

After completion of the surface treatment, as shown in FIGS. 1 to 5, a conductive resin is applied to the surface of the surface treatment layer 12 to form the conductive resin layer 13 (S13), thereby manufacturing the metal foil 10. FIG. 1 shows an example in which one conductive resin layer 13 is formed on the upper surface of the surface treatment layer 12 formed on the upper surface of the metal base substrate 11. FIG. 2 shows another example in which one conductive resin layer 13 is formed in the same manner as the example shown in FIG. 1, except that the surface treatment layer 12 is formed on both the upper and lower surfaces of the metal base substrate 11, after which the conductive resin layer 13 is formed on the upper surface of the surface treatment layer 12 formed on the upper surface of the metal base substrate 11. FIG. 3 shows still another example two surface treatment layers 12 and two conductive resin layers 13 are formed by forming the surface treatment layer 12 on both the upper and lower surfaces of the metal base substrate 11, and then forming the conductive resin layer 13 not only on the upper surface of the surface treatment layer 12 formed on the upper surface of the metal base substrate 11, but also on the lower surface of the surface treatment layer 12 formed on the lower surface of the metal base substrate 11.

The conductive resin layer 13 is formed by applying a conductive resin solution, and a method for preparing the conductive resin solution using a conductive resin material is known, and thus the description thereof is omitted herein. The conductive resin material that is used in the present invention is one selected from among acrylic resin, nitrocellulose and chitosan.

A method for manufacturing an electrode of the present invention using the metal foil 10 as described above will now be described.

As shown in FIGS. 1 to 5, a method for manufacturing an electrode according to the present invention comprises the steps of: (S11) preparing a surface treatment solution; (S12) dipping a metal base substrate 11 in the prepared surface treatment solution while spraying the surface treatment solution onto the surface of the metal base substrate 11, thereby treating the surface of the metal base substrate 11; (S13) applying a conductive resin to the treated surface of the surface treatment layer 12 to form a conductive resin layer 13; and (S14) forming an electrode material layer 14 on the conductive resin layer 13.

The metal foil manufacturing steps (S11 to S13) in the electrode manufacturing method according to the present invention are similar to the method for manufacturing the metal foil 10 as described above, and thus the detailed description thereof is omitted herein.

After completion of the metal foil 10, as shown in FIGS. 1 to 4, an electrode material is applied to the surface of the conductive resin layer 13 to form an electrode material layer 14 (S14).

As shown in FIG. 1, when one electrode material layer 14 is to be formed, it is formed on the upper surface of the conductive resin layer 13 after the surface treatment layer 12 and the conductive resin layer 13 are sequentially formed on the upper surface of the metal base substrate 11.

In another example shown in FIG. 2, one electrode material layer 14 is formed. In this example, the surface treatment layer 12 is formed on both the upper and lower surfaces of the metal base substrate 11, and then the conductive resin layer 13 and the electrode material layer 14 are sequentially formed on the upper surface of the surface treatment layer 12 formed on the upper surface of the metal base substrate 11.

In still another example shown in FIG. 3, two electrode material layers 14 are formed. In this example, the surface treatment layer 12 and the conductive resin layer 13 are sequentially formed on both the upper and lower surfaces of the metal base substrate 11, and then the electrode material layer 14 is formed not only on the upper surface of the conductive resin layer 13 disposed on the metal base substrate 11, but also on the lower surface of the conductive resin layer 13 disposed under the metal base substrate 11.

The electrode material layer 14 is formed of one of a cathode (positive electrode) material and an anode (negative electrode) material, and each of the cathode material and the anode material is applied using a silk printing method or a roll-to-roll method. The cathode material that is applied using the silk printing method or the roll-to-roll method is one selected from activated carbon and metal oxides, including LCO (lithium cobalt oxide), LMO (lithium manganese oxide) and LFP (lithium iron phosphate), and the anode material is one selected from among activated carbon, graphite, hard carbon, soft carbon, silicone, and $Li_4Ti_5O_{12}$.

Regarding the selection of the cathode material and the anode material, when the electrode that is manufactured by the electrode manufacturing method of the present invention is applied to an electrical double-layer capacitor or a hybrid capacitor, activated carbon is selected as the cathode material, and one of activated carbon and $Li_4Ti_5O_{12}$ is selected as the anode material. Specifically, when the electrode that is manufactured by the electrode manufacturing method of the present invention is applied to an electrical double-layer capacitor, activated carbon is selected as the cathode material, and activated carbon is used as the anode material, and when the electrode is applied to a hybrid capacitor, activated carbon is used as the cathode material, and one selected from among activated carbon and $Li_4Ti_5O_{12}$ is used as the anode material. When the electrode that is manufactured by the electrode manufacturing method of the present invention is applied to a lithium ion secondary battery, one selected from among LCO, LMO and LFP is used as the cathode material, and one selected from among graphite, hard carbon, soft carbon, and silicone is used as the anode material.

In order to test the above-described metal foil and electrode of the present invention, a metal foil, an electrode and a lithium ion secondary battery comprising the electrode were manufactured according to the metal foil manufacturing method and electrode manufacturing method of the present invention.

Example 1

In Example 1 of the present invention, a physical test was performed to examine the state of application of a conductive resin solution used to form the conductive resin layer 13, based on whether the surface treatment layer 12 (shown in FIG. 1) was formed on the surface of the metal base substrate 11 (shown in FIG. 1) of the metal foil 10 (shown in FIG. 1). In Example 1 of the present invention, an aluminum foil (A1235) was used as the metal base substrate 11.

The aluminum foil (A1235) used had a thickness of 20 µm, and a surface treatment layer 12 was formed on the surface of the aluminum foil. The surface treatment layer 12 was formed to have a surface energy value of 44 dyne/cm by dipping the aluminum foil in a surface treatment solution (stored in a surface processing bath 110 (shown in FIG. 5)) at a temperature of 60° C. for 8 seconds while spraying the surface treatment solution onto the surface of the aluminum foil through a nozzle 140 (see FIG. 5). Herein, the surface treatment solution was prepared by mixing 4 wt % of sodium hydroxide as an alkaline metal oxide, 0.5 wt % of sodium oleate as a surfactant, 2 wt % of sodium metasilicate as a reducing agent, and 93.5 wt % of deionized water, and diluting 5 wt % of the mixture with 95 wt % of deionized water. As the surface treatment solution sprayed through the nozzle 140, the same solution as the surface treatment solution stored in the surface processing bath 110 was used.

Figure 6:
FIGS. 6 and 7 are photographs showing a state in which a conductive resin solution was applied to the surface of an aluminum foil.
Figure 7:

To each of the surface of the aluminum foil having the surface treatment layer 12 formed thereon according to Example 1 of the present invention and the surface of an aluminum foil having no surface treatment layer 12 formed thereon, a conductive resin solution for forming the conductive resin layer 13 was applied. The results of application of the conductive resin solution are shown in FIGS. 6 and 7. FIGS. 6 and 7 show the result of testing the application of the conductive resin solution in the present invention. The application of the conductive resin layer 13 (shown in FIG. 1) could be tested based on the state of application of the conductive resin solution after drying of the applied conductive resin solution.

FIG. 6 shows a state in which the conductive resin solution for forming the conductive resin layer 13 was applied to the surface of the aluminum foil having no surface treatment layer 13 formed thereon. In FIG. 6, the region indicated by gray indicates the aluminum foil, and the region indicated by black indicates a region applied with the conductive resin solution. FIG. 7 shows a state in which the conductive resin solution for forming the conductive resin layer 13 was applied to the surface of the surface treatment layer 12 formed by treating the surface of the aluminum foil in the present invention. In FIG. 7, the portion indicated by black indicates a region applied with the conductive resin solution. Herein, the conductive resin solution was prepared by adding fine carbon particles and water to a chitosan compound cross-linked with a conductive resin material, in which the cross-linked chitosan compound, the fine carbon particles, and water were used at a weight ratio of 30:20:50 (wt %). The conductive resin solution was applied to the surface of the aluminum foil by an automatic applicator (not shown).

The results of testing the application of the conductive resin solution are as follows. As shown in FIG. 6, in the case in which the surface treatment layer 12 was not formed, the adhesion of the conductive resin solution to the surface of the aluminum foil was poor, and the conductive resin solution aggregated so that it would not be uniformly distributed on the surface of the aluminum foil. On the contrary, as shown in FIG. 7, in the case in which the surface treatment layer 12 was formed on the aluminum foil, the black portion (i.e., the conductive resin solution) was uniformly distributed throughout the surface of the aluminum foil by the surface treatment layer 12, indicating that the conductive resin solution was applied to the aluminum foil with high adhesion.

Example 2

In Example 2 of the present invention, a conductive resin layer 13 was prepared in order to perform a physical test (i.e., tape peeling test). Herein, the conductive resin layer 13 was prepared by drying the conductive resin solution (shown in each of FIGS. 6 and 7) in a drying furnace (not shown) at 180° C. for 8 minutes.

In the tape peeling test, to the surface of the conductive resin layer 13 formed by drying the conductive resin solution shown each of FIGS. 6 and 7, a polypropylene adhesive tape 150 (shown in each of FIGS. 8 and 9) having a width of 10 mm and a length of 150 mm was adhered by applying an uniform load of 20±0.4 N (Newton) with the reciprocating movement of a press roller. After the adhesive tape was adhered to the surface of the conductive resin layer 13, the adhesive tape 150 was peeled off at a speed of 10 mm/s and an angle of 90° by use of an automatic adhesion tester (not shown), and whether the conductive resin layer 13 was peeled off was observed.

Figure 8:
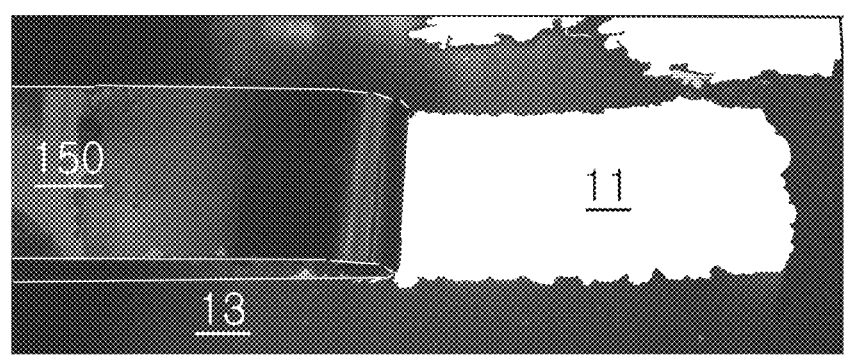
FIGS. 8 and 9 are photographs showing the results of a tape peeling test and peeling test performed on conductive resin layers formed in an electrode manufacturing method shown in FIG. 4.
Figures 9, 10:
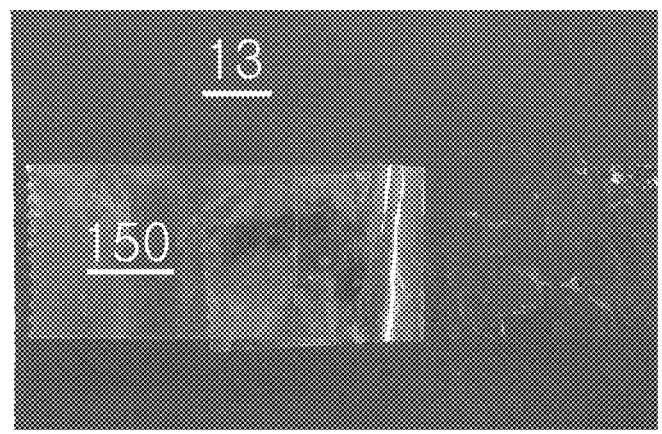
FIG. 10 is a table showing the results of electrical tests performed on electrodes manufactured by an electrode manufacturing method shown in FIG. 4.

As a result, as can be seen in FIG. 8, the conductive resin layer 13 prepared by drying the conductive resin solution shown in FIG. 6 was easily peeled off so that the surface of the aluminum foil (i.e., metal base substrate 11) would be exposed. However, as shown in FIG. 9, the conductive resin layer 13 prepared by drying the conductive resin solution shown in FIG. 7 was adhered strongly. In FIGS. 8 and 9, the black region indicates the conductive resin layer 13, and the white region indicates the surface of the aluminum foil (i.e., metal base substrate 11).

In a peeling test, the surface of the conductive resin solution formed by drying the conductive resin solution shown each of FIGS. 6 and 7 was rubbed with each of a cotton swab (not shown) soaked with deionized water (aqueous solvent) and a cotton swab (not shown) soaked with NMP (N-methyl-2-pyrrolidone) (organic solvent), and the number of rubbings when the conductive resin layer 13 started to be peeled off was measured.

As a result, the conductive resin layer 13 prepared by drying the conductive resin solution shown in FIG. 6 was peeled when it was rubbed 10 times with the aqueous solvent and when it was rubbed 12 times with the organic solvent. However, the conductive resin layer 13 prepared by drying the conductive resin solution shown in FIG. 7 was not peeled off even when it was rubbed 50 times (standard value) with either of the aqueous solvent and the organic solvent.

Example 3

In Example 3 of the present invention, an electrode 20 (shown in FIG. 1) and a lithium ion secondary battery (not shown) comprising the electrode 20 were manufactured in order to test electrical properties, including capacity retention rate, impedance, and battery life span.

In Example 3 of the present invention, the electrode 20 was manufactured by applying an electrode material layer 14 (shown in FIG. 1) to the conductive resin layer 13 formed in Example 2 of the present invention, that is, the conductive resin layer 13 formed by drying the conductive resin solution shown in each of FIGS. 6 and 7.

The electrode material layer 14 was manufactured as a cathode and an anode. For example, a cathode electrode 20 and an anode electrode 20 were manufactured by applying each of a cathode electrode and an anode material on the surface of the conductive resin layer 13 formed by drying the conductive resin solution shown in FIG. 6. In addition, using the conductive resin layer 13 formed by drying the conductive resin solution shown in FIG. 7, a cathode electrode 20 and an anode electrode 20 were manufactured in the same manner as described above.

Among the electrodes 20 for manufacturing a lithium ion secondary battery, the cathode was manufactured using lithium cobalt oxide (LCO) as a cathode active material, carbon black as a conductive material, and polyvinylidene difluoride (PVDF) as a binder, which were mixed at a weight ratio of 92:3:5 (wt %). The anode was manufactured using crystalline graphite as an anode active material and PVDF as a binder, which were mixed at a weight ratio of 90:10 (wt %).

After the cathode and the anode for a lithium ion secondary battery were manufactured, a separator made of porous polyethylene was interposed between the cathode and the anode, and an electrolyte prepared by dissolving lithium hexafluorophosphate ($LiPF_6$) in a 5:5 solvent mixture of ethylene carbonate (EC) and diethylene carbonate (DEC) at a concentration of 1 mol/L was introduced into the resulting structure, thereby manufacturing a lithium ion secondary battery. Specifically, a cathode electrode 20 and an anode electrode 20 were manufactured by applying a cathode material and an anode material to the surface of the conductive resin layer 13 formed by drying the conductive resin solution shown in FIG. 6, and a lithium ion secondary battery (hereinafter referred to as the "battery1") was manufactured using the manufactured cathode electrode and anode electrode. In the same manner, a cathode electrode 20 and an anode electrode 20 were manufactured by applying a cathode material and an anode material to the surface of the conductive resin layer 13 formed by drying the conductive resin solution shown in FIG. 7, and a lithium ion secondary battery (hereinafter referred to as the "battery 2") was manufactured using the manufactured cathode electrode and anode electrode.

To test the capacity retention rates of battery 1 and battery 2 manufactured in Example 3 of the present invention, each of the batteries was cycled for 200 cycles using a charge/discharge tester (manufactured by TOYO SYSTEM) at a voltage ranging from 2.7 to 4.0 V, a temperature of 25° C. and C-rates (current rates) of 1C, 5C, 10C and 20C, and the ratio of the initial capacity to the capacity after 200 cycles of each battery was measured, thereby determining the capacity retention rate (%) of each battery. As a result, as shown in FIG. 10, as the C-rate increased, battery 2 comprising the electrode 20 of the present invention showed a capacity retention rate higher than that of battery 1.

To test the impedances of battery 1 and battery 2 manufactured in Example 3 of the present invention, the impedance of each of the batteries was measured five times at a frequency of 1 kHz using an AC impedance tester (manufactured by HIOKI), and the measurements were averaged for comparison. As a result, as shown in FIG. 10, battery 2 comprising the electrode 20 of the present invention showed an impedance value which was about 5 times lower than that of battery 1.

Figure 11:
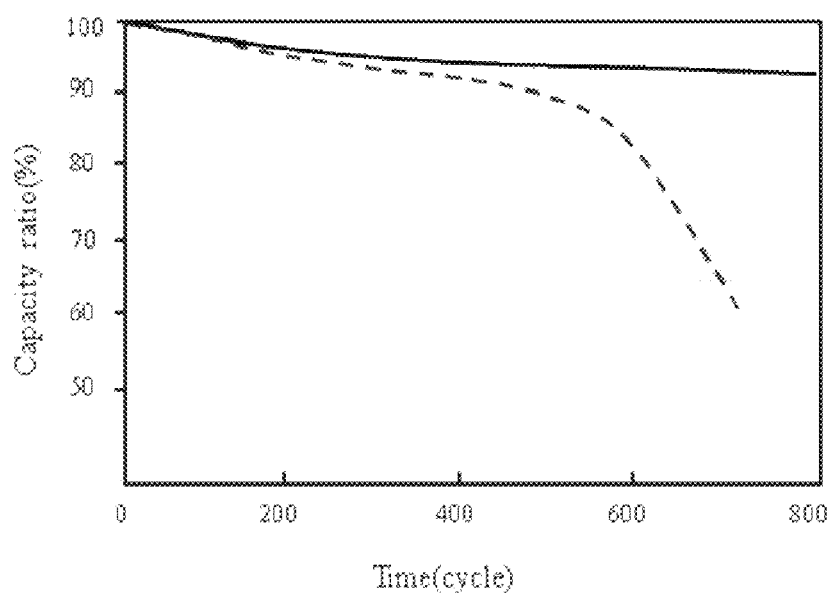
FIGS. 11 and 12 are graphs showing the results of electrical tests performed on electrodes manufactured by an electrode manufacturing method shown in FIG. 4.
Figure 12:
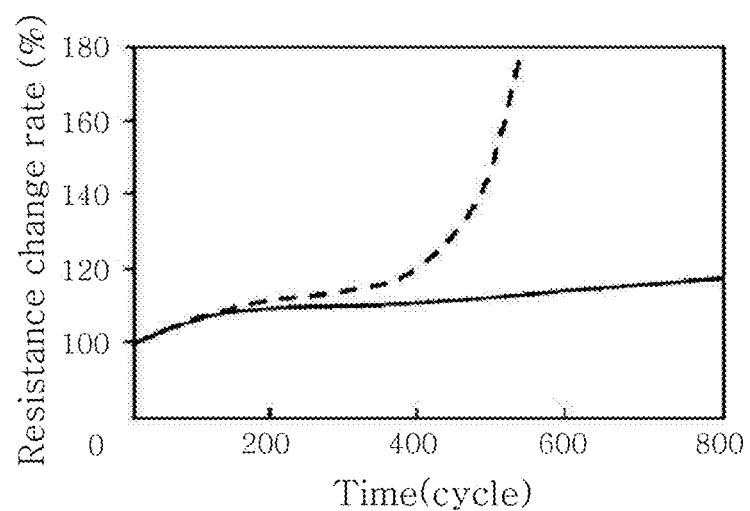

To test the life spans of battery 1 and battery 2 manufactured in Example 3 of the present invention, each of the batteries was charged/discharged for 800 cycles using a charge/discharge tester (manufactured by TOYO SYSTEM) under the conditions of constant current and constant voltage charge and constant current discharge at 2C-rate, a voltage ranging from 2.7V to 4.0V and a temperature of 45° C., and the capacity and resistance change rates over time (cycle) were measured. The results of the measurement are shown in FIGS. 11 and 12. As shown in FIGS. 11 and 12, it can be seen that the calendar life of battery 2 comprising the electrode 20 of the present invention significantly increased compared to that of battery 1. In the graphs shown in FIGS. 11 and 12, the curve indicated by the dotted line represents the characteristics of battery 1, and the curve indicated by the solid line represents the characteristics of battery 2.

As described above, according to the metal foil of the present invention, the method for manufacturing the metal foil, and the method for manufacturing an electrode using the same, the adhesion between the metal foil and the conductive resin layer and the coating performance of the conductive resin layer can be improved by treating the surface of the metal foil, thereby alleviating the peeling of the electrode material from the metal foil to thereby reduce the interfacial resistance of the metal foil. In addition, as a result of improving the adhesion between the metal foil and the conductive resin layer and the coating performance of the conductive resin layer to thereby alleviate the peeling of the electrode material from the metal foil to thereby reduce the interfacial resistance of the metal foil, the output and calendar life characteristics of a lithium ion secondary battery or an electrical double-layer capacitor can be improved when the electrode of the present invention is applied to the lithium ion secondary battery or the electrical double-layer capacitor.

The metal foil of the present invention, the method for manufacturing the metal foil, and the method for manufacturing an electrode using the same, can be applied in the manufacture of metal foils or electrodes and the manufacture of lithium ion secondary batteries or electric double layer capacitors.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method for manufacturing a metal foil, comprising the steps of:
   preparing a surface treatment solution;
   treating a surface of a metal base substrate by dipping a metal base substrate in the surface treatment solution while spraying the surface treatment solution onto the surface of the metal base substrate, thereby forming a surface treatment layer on the metal base substrate; and
   applying a conductive resin to the surface of the surface treatment layer to form a conductive resin layer,
   wherein the surface treatment solution is prepared by mixing 3-10 wt % of an alkaline metal oxide, 0.1-10 wt % of a surfactant, 0.5-10 wt % of a reducing agent and 70-96.4 wt % of deionized water to prepare an undiluted surface treatment solution, and diluting 3-10 wt % of the undiluted surface treatment solution with 90-97 wt % of deionized water.

2. The method of claim 1, wherein the alkaline metal oxide that is used in the step of preparing the surface treatment solution is one selected from among sodium hydroxide, sodium carbonate, and sodium metasilicate; the surfactant is selected from among sodium oleate, polyoxyethylene alkylphenyl ether, and sodium myristate; and the reducing agent is selected from among sodium metasilicate, sodium silicate, benzthiazol, and benzimidazole.

3. The method of claim 1, wherein
   the surface treatment solution is prepared using sodium hydroxide as the alkaline metal oxide, sodium oleate as the surfactant, and sodium metasilicate as the reducing agent; or
   the surface treatment solution is prepared using sodium carbonate as the alkaline metal oxide, polyoxyethylene alkylphenyl ether as the surfactant, and sodium silicate as the reducing agent; or
   the surface treatment solution is prepared using sodium metasilicate as the alkaline metal oxide, sodium myristate as the surfactant, and benzthiazol or benzimidazole as the reducing agent.

4. The method of claim 1, wherein
   the surface treatment solution is prepared by mixing 3-8 wt % sodium hydroxide as an alkaline metal oxide, 0.1-1 wt % of sodium oleate as a surfactant, 0.5-3 wt % sodium metasilicate of a reducing agent and 88-96.4 wt % of deionized water to prepare an undiluted surface treatment solution, and diluting 3-10 wt % of the undiluted surface treatment solution with 90-97 wt % of deionized water, and treating the surface of the metal base substrate with the surface treatment solution having the above-described composition is performed by dipping the metal base substrate in the surface treatment solution for 3-13 seconds in a state in which the surface treatment solution is maintained at a temperature of 60 to 70° C.;
   the surface treatment solution is prepared by mixing 4-10 wt % sodium carbonate as as an alkaline metal oxide, 3-10 wt % of polyoxyethylene alkylphenyl ether as the surfactant, 4-6 wt % sodium silicate of a reducing agent and 74-89 wt % of deionized water to prepare an undiluted surface treatment solution, and diluting 3-10 wt % of the undiluted surface treatment solution with 90-97 wt % of deionized water, and treating the surface of the metal base substrate with the surface treatment solution having the above-described composition is performed by dipping the metal base substrate in the surface treatment solution for 5-15 seconds in a state in which the surface treatment solution is maintained at a temperature of 70 to 80° C.; or
   the surface treatment solution is prepared by mixing 5-10 wt % sodium metasilicate as an alkaline metal oxide, 0.1-8 wt % sodium myristate of as the surfactant, 0.1-3 wt % benzthiazol or benzimidazole of a reducing agent and 79-94.8 wt % of deionized water to prepare an undiluted surface treatment solution, and diluting 3-10 wt % of the undiluted surface treatment solution with 90-97 wt % of deionized water, and treating the surface of the metal base substrate with the surface treatment solution having the above-described composition is performed by dipping the metal base substrate in the surface treatment solution for 10-20 seconds in a state in which the surface treatment solution is maintained at a temperature of 75 to 85° C.

5. The method of claim 1, wherein the metal base substrate that is used in the step of treating the surface of the metal base substrate is formed in a foil shape and made of aluminum or copper, and
   the step of forming the surface treatment layer comprises:
   storing the surface treatment solution in a surface treatment bath; and
   dipping the metal base substrate in the surface treatment solution for 3-20 seconds while spraying the surface treatment solution onto the surface of the metal base substrate through a nozzle disposed in the surface processing bath, in a state in which the surface processing solution is maintained at a temperature of 60 to 85° C., thereby forming a surface treatment layer having a surface energy of 34-46 dyne/cm on at least one surface of the metal base substrate.

6. A method for manufacturing an electrode, comprising the steps of:
preparing a surface treatment solution;
treating a surface of a metal base substrate by dipping a metal base substrate in the surface treatment solution while spraying the surface treatment solution onto the surface of the metal base substrate, thereby forming a surface treatment layer on the metal base substrate;
applying a conductive resin to the surface of the surface treatment layer to form a conductive resin layer; and
applying an electrode material to the surface of the conductive resin layer to form an electrode material layer,
wherein the surface treatment solution is prepared by mixing 3-10 wt % of an alkaline metal oxide, 0.1-10 wt % of a surfactant, 0.5-10 wt % of a reducing agent and 70-96.4 wt % of deionized water to prepare an undiluted surface treatment solution, and diluting 3-10 wt % of the undiluted surface treatment solution with 90-97 wt % of deionized water.

7. The method of claim 6, wherein the alkaline metal oxide that is used in the step of preparing the surface treatment solution is one selected from among sodium hydroxide, sodium carbonate, and sodium metasilicate; the surfactant is selected from among sodium oleate, polyoxyethylene alkylphenyl ether, and sodium myristate; and the reducing agent is selected from among sodium metasilicate, sodium silicate, benzthiazol, and benzimidazole.

8. The method of claim 6, wherein the metal base substrate that is used in the step of treating the surface of the metal base substrate is formed in a foil shape and made of aluminum or copper, and
the step of forming the surface treatment layer comprises dipping the metal base substrate in a surface processing bath containing the surface treatment solution while spraying the surface treatment solution onto the surface of the metal base substrate through a nozzle disposed in the surface processing bath, thereby forming a surface treatment layer having a surface energy of 34-46 dyne/cm on at least one surface of the metal base substrate.

9. The method of claim 6, wherein the electrode material layer that is formed in the step of forming the electrode material layer is formed of one of a cathode material and an anode material,
wherein the cathode material is one selected from among activated carbon, LCO (lithium cobalt oxide), LMO (lithium manganese oxide), and LFP (lithium iron phosphate), and the anode material is one selected from among activated carbon, graphite, hard carbon, soft carbon, silicone, and $Li_4Ti_5O_{12}$, and
wherein, when activated carbon is selected as the cathode material, one of activated carbon or $Li_4Ti_5O_{12}$ is selected and used as the anode material, and when one of LCO, LMO and LFP is selected as the cathode material, one of graphite, hard carbon, soft carbon and silicone is selected and used as the anode material.

\* \* \* \* \*